(12) United States Patent
Leem

(10) Patent No.: US 10,177,600 B2
(45) Date of Patent: Jan. 8, 2019

(54) TRANSMISSION COIL MODULE FOR WIRELESS POWER TRANSMITTER

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/805,835

(22) Filed: Nov. 7, 2017

(65) Prior Publication Data

US 2018/0061564 A1  Mar. 1, 2018

Related U.S. Application Data

(63) Continuation of application No. 15/367,925, filed on Dec. 2, 2016, now Pat. No. 9,899,147.

(30) Foreign Application Priority Data

Dec. 17, 2015  (KR) .................. 10-2015-0181030

(51) Int. Cl.
| | | |
|---|---|---|
| *H01F 27/42* | (2006.01) | |
| *H01F 37/00* | (2006.01) | |
| *H01F 38/00* | (2006.01) | |
| *H02J 50/10* | (2016.01) | |
| *H01F 27/28* | (2006.01) | |
| *H01F 38/14* | (2006.01) | |

(Continued)

(52) U.S. Cl.
CPC .......... *H02J 50/10* (2016.02); *H01F 27/2885* (2013.01); *H01F 27/367* (2013.01); *H01F 38/14* (2013.01); *H02J 50/90* (2016.02)

(58) Field of Classification Search
CPC .. H02J 50/10; H02J 50/40; H02J 50/90; H02J 5/005; H02J 7/025; H02J 17/00; H01F 38/14; H01F 27/2885; H01F 27/367; H04B 5/0037

See application file for complete search history.

(56) References Cited

U.S. PATENT DOCUMENTS

| | | | |
|---|---|---|---|
| 9,667,086 B2* | 5/2017 | Koyanagi | H01M 10/46 |
| 2009/0284341 A1* | 11/2009 | Okada | H01F 38/14 336/232 |

(Continued)

FOREIGN PATENT DOCUMENTS

| | | |
|---|---|---|
| JP | 2010-161725 A | 7/2010 |
| JP | 2012-210118 A | 10/2012 |

(Continued)

OTHER PUBLICATIONS

KR Application No. 10-2016-0161153 is published as KR 10-2017-0010736-A (Foreign Patent Document No. 12).

*Primary Examiner* — Carlos D Amaya
(74) *Attorney, Agent, or Firm* — Birch, Stewart, Kolasch & Birch, LLP

(57) ABSTRACT

A transmitting coil module for wirelessly transmitting power, the transmitting coil module including at least one transmission coil having a hollow portion in a center area thereof; a shield disposed below the at least one transmission coil; and a metal sheet disposed below the shield. Further, the shield includes at least one functional hole in a region corresponding to the hollow portion of the at least one transmission coil.

19 Claims, 10 Drawing Sheets

(51) Int. Cl.
*H01F 27/36* (2006.01)
*H02J 50/90* (2016.01)

(56) References Cited

U.S. PATENT DOCUMENTS

2013/0106198 A1    5/2013  Kuk et al.
2017/0033610 A1*   2/2017  Borin .................... H01F 27/365

FOREIGN PATENT DOCUMENTS

| JP | 2013-70606     | A  | 4/2013  |
|----|----------------|----|---------|
| JP | 2013-229987    | A  | 11/2013 |
| JP | 2015-15437     | A  | 1/2015  |
| JP | 5805609        | B2 | 11/2015 |
| KR | 10-2011-0035196 | A  | 4/2011  |
| KR | 10-2013-0008972 | A  | 1/2013  |
| KR | 10-2013-0031411 | A  | 3/2013  |
| KR | 10-2014-0019955 | A  | 2/2014  |
| KR | 10-2014-0060798 | A  | 5/2014  |
| KR | 10-1414779     | B1 | 7/2014  |
| KR | 10-2014-0146530 | A  | 12/2014 |
| KR | 10-2015-0047347 | A  | 5/2015  |
| KR | 10-2015-0115271 | A  | 10/2015 |
| KR | 10-1559939     | B1 | 10/2015 |
| KR | 10-1574214     | B1 | 12/2015 |
| KR | 10-2017-0010736 | A  | 2/2017  |

* cited by examiner

TRANSMISSION COIL MODULE FOR WIRELESS POWER TRANSMITTER

CROSS REFERENCE TO RELATED APPLICATION

This application is a Continuation of co-pending application Ser. No. 15/367,925, filed on Dec. 2, 2016, which claims priority under 35 U.S.C. § 119(a) to Application No. 10-2015-0181030, filed in Republic of Korea on Dec. 17, 2015, all of which are hereby expressly incorporated by reference into the present application.

TECHNICAL FIELD

Embodiments relate to a wireless power transfer technology, and more particularly, to a method of mounting a transmission coil, which wirelessly transmits power, in a wireless power transmitter.

BACKGROUND

With the recent development of information and communication technology, a ubiquitous society based on information and communication technology has arisen.

In order to enable access to and by information sharing appliances without regard to time or place, sensors, which incorporate computer chips having a communication function therein, need to be installed in all public facilities. Thus, problems related to the supply of power to these appliances or sensors have newly arisen. In addition, as the kinds of portable appliances, such as, for example, mobile phones, Bluetooth handsets, and music players such as iPod, have rapidly increased, the task of charging a battery demands time and effort on the part of the user. As a method to solve this problem, a wireless power transfer technology has recently received attention.

A wireless power transmission (or wireless energy transfer) technology is a technology that wirelessly transfers electricity from a transmitter to a receiver using the principle of induction of a magnetic field. An electric motor or a transformer using the principle of electromagnetic induction has been used since the 1800's, and since that time methods of transferring electricity by emitting electromagnetic waves such as laser or radio waves have been attempted. Electric toothbrushes or some wireless razors that are often used are actually charged based on the principle of electromagnetic induction.

Wireless energy transfer methods that have been achieved thus far may be broadly divided into a magnetic induction method, an electromagnetic resonance method, and an RF transmission method using a short-wavelength radio frequency.

The magnetic induction method is a technology using a phenomenon whereby, when two coils are arranged close to each other and current is applied to one coil, a magnetic flux is generated to generate electromotive force in the other coil, and the commercialization of magnetic induction is quickly progressing in the field of small appliances such as mobile phones. The magnetic induction method may transmit power of a maximum of several hundred kilowatts (kW) and may have high efficiency. However, since the maximum transfer distance is 1 cm or less, an appliance needs to be generally located close to a charger or a substrate.

The electromagnetic resonance method has the feature of using an electric field or a magnetic field, rather than using electromagnetic waves, current or the like. The electromagnetic resonance method is hardly influenced by an electromagnetic wave, and therefore is harmless to other electronic appliances or humans. In contrast, the electromagnetic resonance method may be used at a limited distance and in a limited space, and the energy transfer efficiency thereof is somewhat low.

The short-wavelength wireless power transfer method,—referred to in brief as an RF transmission method,—uses a method of directly transmitting and receiving energy in the form of radio waves. This technology is an RF type wireless power transfer method using a rectenna. "Rectenna" is a portmanteau of "antenna" and "rectifier", and means an element that directly converts RF power into direct current (DC) power. That is, the RF transmission method is a technology of converting alternating current (AC) radio waves into DC radio waves and using DC radio waves. Recently, research into the commercialization of RF transmission has been actively conducted as the efficiency thereof has improved.

Such wireless power transfer technology may be variously used in all industries, such as, for example, IT, rail, and consumer electronics, in addition to the mobile industry.

Recently, in order to increase the rate of recognition of a wireless power receiver placed on a charger bed, a wireless power transmitter in which a plurality of coils is mounted has been launched. The coils need to be located at appropriate positions in order to optimize power transmission efficiency and to prevent the formation of dead zones, in which charging is impossible.

That is, the arrangement and fixing of the coils included in the wireless power transmitter and the electrical connection between the coils and peripheral circuits are important in determining the performance of the wireless power transmitter. However, when the arrangement and fixing of the coils and the electrical connection with peripheral circuits are changed due to various factors in the process of manufacturing the wireless power transmitter, wireless power transmission having a desired quality may not be realized.

SUMMARY

Accordingly, embodiments are devised to solve the problems of the related art described above, and provide a transmission coil module for a wireless power transmitter.

In addition, embodiments provide a transmission coil module for a wireless power transmitter, which may maintain a desired quality as the result of mounting transmission coils in the wireless power transmitter in a modular device.

The technical objects to be accomplished by the embodiments are not limited to the aforementioned technical objects, and other unmentioned technical objects will be clearly understood from the following description by those having ordinary skill in the art.

In one embodiment, a transmission coil module includes a transmission coil for wirelessly transmitting power, a coil frame including a receptacle for insertion of the transmission coil, a support unit for surrounding the receptacle, and a central fixing plate formed inside the receptacle and corresponding to an inner shape of the transmission coil, and a connector for electrically connecting the transmission coil to a control circuit board, wherein the support unit and the central fixing plate are integrally formed with each other.

The coil frame may have an indented side surface, and the connector may be located in the indented side surface.

The coil frame may further include a lead wire insertion terminal formed in the indented side surface to provide a space into which a lead wire of the transmission coil is fitted.

The connector may be connected to the lead wire, fitted into the lead wire insertion terminal, via soldering using a laser.

The transmission coil module may further include a shield mounted below the transmission coil, and a metal sheet mounted below the shield, and the shield and the metal sheet may be located inside the coil frame.

The shield may be a ferrite sheet.

The metal sheet may include aluminum.

In another embodiment, a transmission coil module includes a first wireless transmission coil, a second wireless transmission coil and a third wireless transmission coil located below the first wireless transmission coil and spaced apart from each other in the same plane, a coil frame including a first receptacle for insertion of the first wireless transmission coil, a second receptacle for insertion of the second wireless transmission coil, a third receptacle for insertion of the third wireless transmission coil, a support unit for surrounding the first, second and third receptacles, and first, second and third central fixing plates corresponding to an inner shape of each of the first, second and third wireless transmission coils, and a connector for electrically connecting the first, second and third wireless transmission coils to a control circuit board, wherein the support unit, the first, second and third central fixing plates are integrally formed with each other.

The embodiments are only some of exemplary embodiments, and various embodiments in which technical features of the embodiments are reflected may be derived and understood based on the following detailed description of the embodiments by those skilled in the art.

BRIEF DESCRIPTION OF THE DRAWINGS

The accompanying drawings are provided to assist in the understanding of the embodiments, and provide the embodiments along with a detailed description. However, the technical features of the embodiments are not limited to particular drawings, and the features illustrated in the respective drawings may be combined with each other so as to configure new embodiments.

Arrangements and embodiments may be described in detail with reference to the following drawings in which like reference numerals refer to like elements and wherein.

DESCRIPTION OF SPECIFIC EMBODIMENTS

Figure 1:
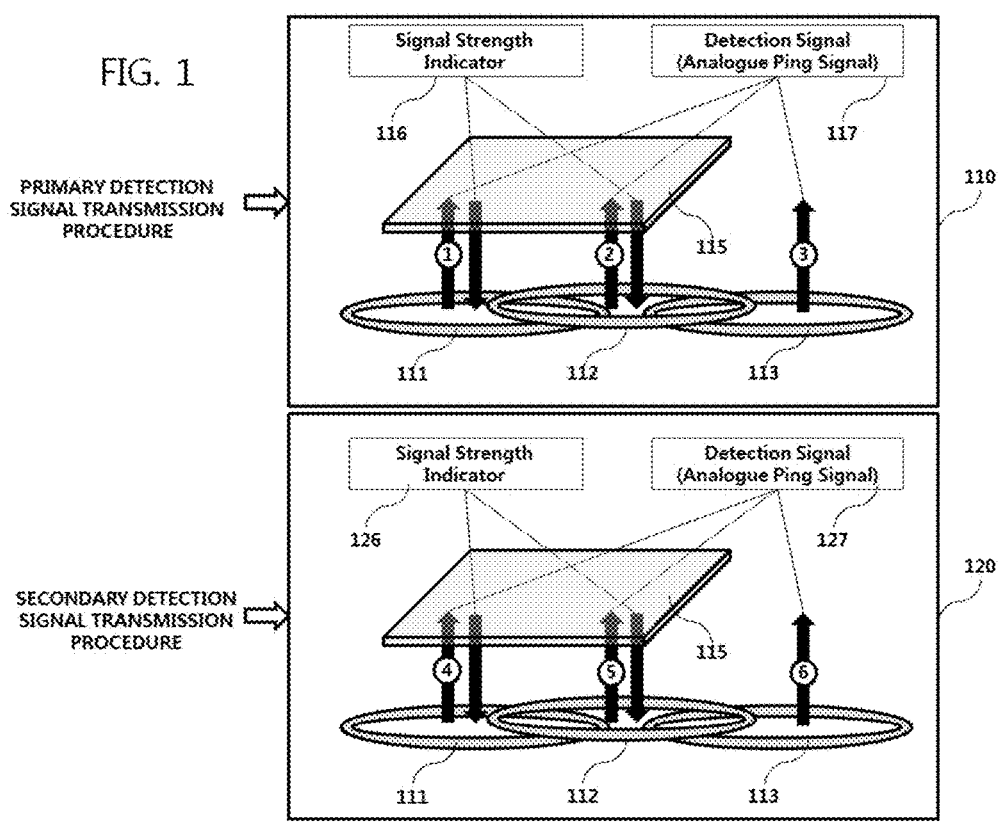
FIG. 1 is a view for explaining a detection signal transmission procedure in a wireless power transmitter according to an embodiment.

Hereinafter, an apparatus and various methods, to which the embodiments are applied, will be described in more detail with reference to the accompanying drawings. The suffixes "module" and "unit" of elements herein are used for convenience of description and thus can be used interchangeably and do not have any distinguishable meanings or functions.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the following description of the embodiments, for convenience of description, an apparatus of wirelessly transmitting power, which configures a wireless power transmission system, may be used interchangeably with a wireless power transmitter, a wireless power transmission apparatus, a transmission terminal, a transmitter, a transmission apparatus, a transmission side, a wireless power transfer apparatus, etc. In addition, for convenience of description, an apparatus for wirelessly receiving power from a wireless power transmission apparatus may be used interchangeably with a wireless power reception apparatus, a wireless power receiver, a receiver, a reception terminal, a reception side, a reception apparatus, etc.

A transmitter according to an embodiment may be configured in the form of a pad, a cradle, an Access Point (AP), a small base station or a stand, and may be of a ceiling-mounted type or a wall-mounted type. One transmitter may transfer power to a plurality of wireless power reception apparatuses. To this end, the transmitter may include at least one wireless power transfer unit. Here, the wireless power transfer unit may use various wireless power transfer standards based on an electromagnetic induction charging method using the principle of electromagnetic induction, in which a power transmission-end coil generates a magnetic field so that electricity is induced in a reception-end coil under the influence of the magnetic field. Here, the wireless power transfer unit may include an electromagnetic induction type wireless charging technology defined by the Wireless Power Consortium (WPC) and the Power Matters Alliance (PMA), which are wireless charging technology standardization organizations.

In addition, a receiver according to an embodiment may include at least one wireless power reception unit, and may wirelessly receive power from two or more transmitters at the same time. Here, the wireless power reception unit may include an electromagnetic-induction-type wireless charging technology that is defined by the Wireless Power Consortium (WPC) and the Power Matters Alliance (PMA), which are wireless charging technology standardization organizations.

The receiver according to the embodiment may be used in small electronic appliances, such as, for example, a mobile phone, a smart phone, a laptop computer, a digital broadcasting terminal, a Personal Digital Assistant (PDA), a Portable Multimedia Player (PMP), a navigation system, an MP3 player, an electric toothbrush, an electronic tag, a lighting apparatus, a remote controller, a float, and a wearable device such as a smart watch, without being limited thereto, and may be used in other various appliances so long as they allow the installation and battery charging of the wireless power reception unit according to the embodiment.

FIG. 1 is a view for explaining a detection signal transmission procedure in a wireless power transmitter according to an embodiment.

Referring to FIG. 1, three transmission coils 111, 112 and 113 may be mounted in the wireless power transmitter. Each transmission coil may overlap at a portion thereof with another transmission coil, and the wireless power transmitter sequentially transmits predetermined detection signals 117 and 127 for detecting the presence of a wireless power receiver (e.g. digital ping signals) in a predefined sequence through each transmission coil.

As illustrated in FIG. 1, the wireless power transmitter may sequentially transmit the detection signals 117 via a primary detection signal transmission procedure designated by reference numeral 110, and may identify the transmission coils 111 and 112 that have received a signal strength indicator 116 from a wireless power receiver 115. Subsequently, the wireless power transmitter may sequentially transmit the detection signals 127 via a secondary detection signal transmission procedure designated by reference numeral 120, may identify one transmission coil that has better power transfer efficiency (or charging efficiency), i.e. that is more closely aligned with a reception coil, among the transmission coils 111 and 112, which have received a signal strength indicator 126, and may perform control for power transfer, i.e. wireless charging, through the identified transmission coil.

As illustrated in FIG. 1, the reason why the wireless power transmitter performs the detection signal transmission procedure two times is to more accurately identify which transmission coil is the most closely aligned with the reception coil of the wireless power receiver.

When the first transmission coil 111 and the second transmission coil 112 have received the signal strength indicators 116 and 126 as illustrated in the blocks designated by reference numerals 110 and 120 of FIG. 1, the wireless power transmitter selects the best-aligned transmission coil based on the signal strength indicator 126 received by each of the first transmission coil 111 and the second transmission coil 112, and performs wireless charging using the selected transmission coil.

Figure 2:
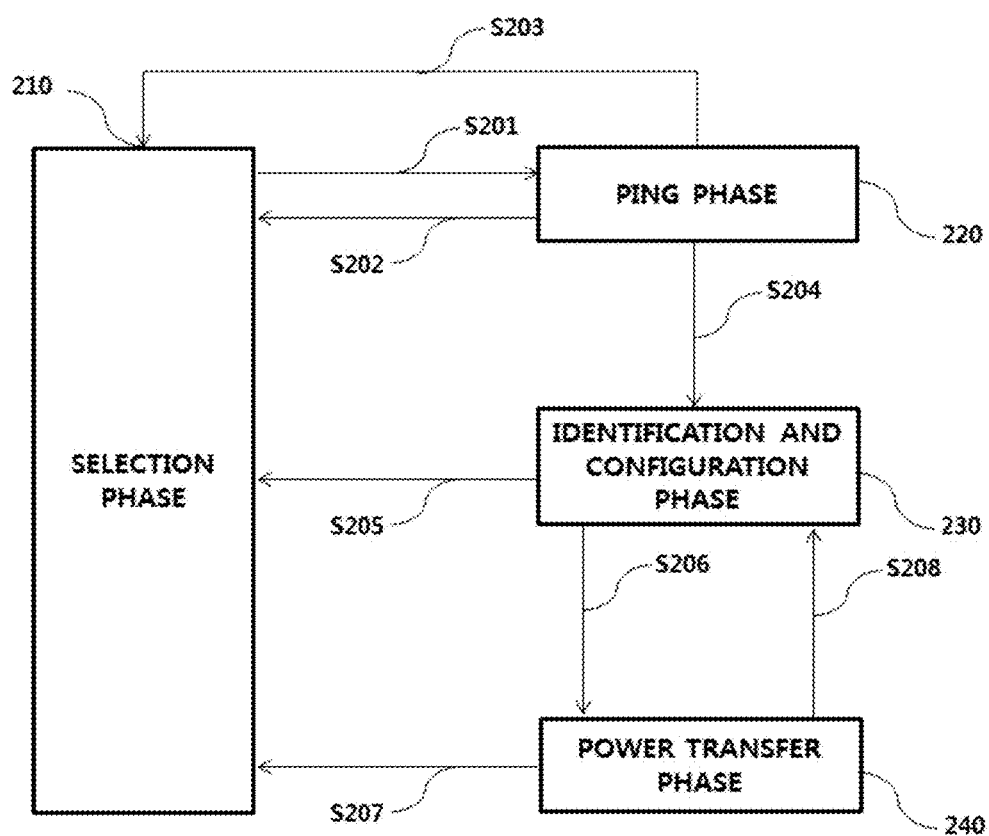
FIG. 2 is a state transition diagram for explaining a wireless power transfer procedure that is defined in the WPC standard.

FIG. 2 is a state transition diagram for explaining a wireless power transfer procedure that is defined in the WPC standard.

Referring to FIG. 2, power transfer from a transmitter to a receiver based on the WPC standard may broadly be divided into a selection phase 210, a ping phase 220, an identification and configuration phase 230, and a power transfer phase 240.

A transmitter may transition to the selection phase 210 when a particular error or a particular event is detected at the time at which power transfer begins or while power transfer is maintained. Here, the particular error and the particular event will become apparent from the following description. In addition, in the selection phase 210, the transmitter may monitor whether an object is present on an interface surface. When the transmitter detects that an object has been placed on the interface surface, the transmitter may transition to the ping phase 220 (S201). In the selection phase 210, the transmitter may transmit an analogue ping signal of a very short pulse, and may detect whether the object is present on the active area of the interface surface based on variation in the current of a transmission coil.

When the presence of the object is detected, in the ping phase 220, the transmitter activates a receiver, and transmits a digital ping signal to identify whether the receiver has compatibility with the WPC standard. When the transmitter receives no response signal with respect to the digital ping signal (e.g. a signal strength indicator) from the receiver in the ping phase 220, the transmitter may again transition to the selection phase 210 (S202). In addition, when the transmitter receives a signal that indicates the completion of power transfer (i.e. an end-of-charge signal) from the receiver in the ping phase 220, the transmitter may also transition to the selection phase 210 (S203).

When the ping phase 220 is completed, the transmitter may transition to the identification and configuration phase 230 for collecting information regarding the identification of the receiver and the configuration and state of the receiver (S204).

When the transmitter receives an unexpected packet or receives no expected packet during a predefined time, when a packet transmission error occurs, or when no power transfer contract is set in the identification and configuration phase 230, the transmitter may transition to the selection phase 210 (S205).

When the identification and configuration for the receiver are completed, the transmitter may transition to the power transfer phase 240 for wireless power transfer (S206).

When the transmitter receives an unexpected packet or receives no expected packet during a predefined time (i.e. a time-out situation), when a violation of a preset power-transfer contract occurs, or when charging ends in the power transmission phase 240, the transmitter may transition to the selection phase 210 (S207).

In addition, the transmitter may transition from the power transfer phase 240 to the identification and configuration phase 230 when it is required to reconfigure a power transfer contract depending on, for example, variation in the state of the transmitter (S208).

The aforementioned power transfer contract may be set based on information regarding the states and properties of the transmitter and the receiver. In one example, the transmitter state information may include information regarding the maximum amount of power that may be transferred and the maximum number of receivers that the transmitter may accommodate, and the receiver state information may include information regarding required power.

Figure 3:
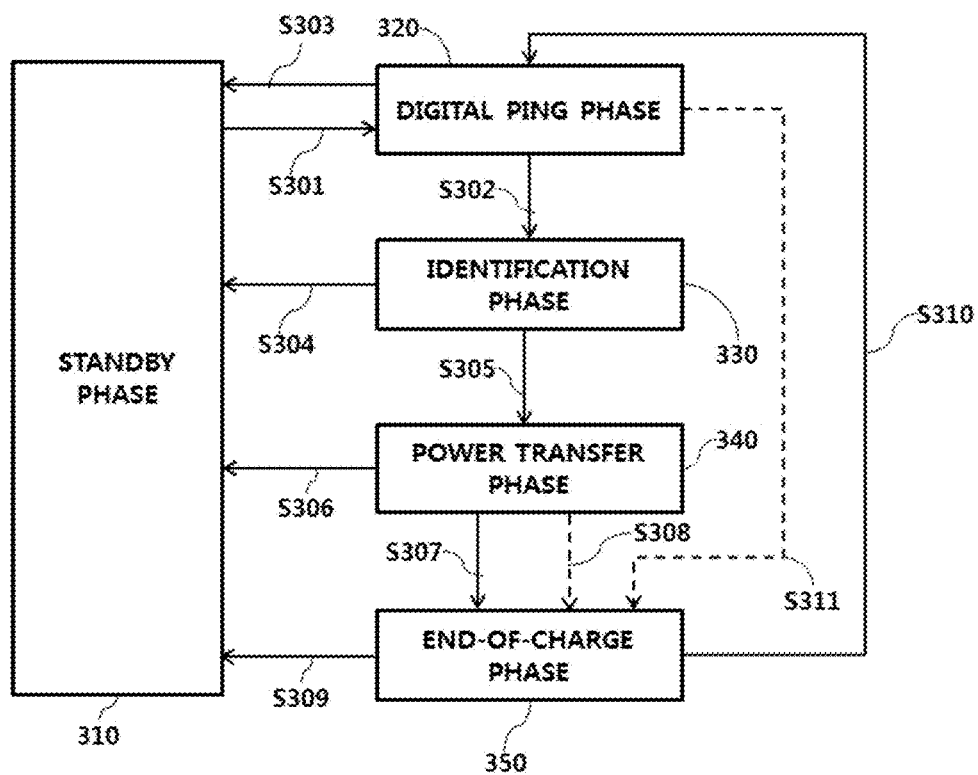
FIG. 3 is a state transition diagram for explaining a wireless power transfer procedure that is defined in the PMA standard.

FIG. 3 is a state transition diagram for explaining a wireless power transfer procedure that is defined in the PMA standard.

Referring to FIG. 3, power transfer from a transmitter to a receiver based on the PMA standard may broadly be divided into a standby phase 310, a digital ping phase 320, an identification phase 330, a power transfer phase 340, and an end-of-charge phase 350.

A transmitter may transition to the standby phase 310 when a particular error or a particular event is detected while a receiver identification procedure for power transfer is performed or while power transfer is underway. Here, the particular error and the particular event will become apparent from the following description. In addition, in the standby phase 310, the transmitter may monitor whether an object is present on a charge surface. When it is detected that an object has been placed on the charge surface or when an RXID retry is underway, the transmitter may transition to the digital ping phase 320 (S301). Here, "RXID" is an inherent identifier assigned to a PMA-capable receiver. In the standby phase 310, the transmitter may transmit an analog ping signal of a very short pulse, and may detect whether an object is present on the active area of the charge surface (e.g. a charger bed) based on variation in the current of a transmission coil.

The transmitter, having transitioned to the digital ping phase 320, transmits a digital ping signal for identifying whether the detected object is a PMA-capable receiver. When sufficient power is supplied to a reception end by the digital ping signal transmitted by the transmitter, the receiver may modulate the received digital ping signal using a PMA communication protocol, thereby transmitting a predetermined response signal to the transmitter. Here, the response signal may include a signal strength indicator, which indicates the strength of power received by the receiver. When receiving an available response signal from the receiver in the digital ping phase 320, the transmitter may transition to the identification phase 330 (S302).

When no response signal is received, or when it is checked that the object is not a PMA-capable receiver (i.e. a Foreign Object Detection (FOD) situation) in the digital ping phase 320, the transmitter may transition to the standby phase 310 (S303). In one example, the Foreign Object (FO) may be a metallic object including, for example, a coin or a key.

In the identification phase 330, when a receiver identification procedure has failed or needs to be performed again, or when the receiver identification procedure does not end within a predefined time, the transmitter may transition to the standby phase 310 (S304).

When receiver identification succeeds, the transmitter may transition from the identification phase 330 to the power transfer phase 340 so as to initiate charging (S305).

In the power transfer phase 340, when the transmitter receives no expected signal within a predetermined time (i.e. a time-out situation) or detects an FO, or when the voltage of a transmission coil exceeds a predefined reference value, the transmitter may transition to the standby phase 310 (S306).

In addition, in the power transfer phase 340, when the temperature sensed by a temperature sensor mounted in the transmitter exceeds a predetermined reference value, the transmitter may transition to the end-of-charge phase 350 (S307).

In the end-of-charge phase 350, when it is checked that the receiver is removed from the charge surface, the transmitter may transition to the standby phase 310 (S309).

In addition, when the temperature measured after a predetermined time has passed becomes a reference value or less in an over-temperature state, the transmitter may transition from the end-of-charge phase 350 to the digital ping phase 320 (S310).

In the digital ping phase 320 or the power transfer phase 340, the transmitter may transition to the end-of-charge phase 350 when receiving an End of Charge (EOC) request from the receiver (S308 and S311).

Figure 4:
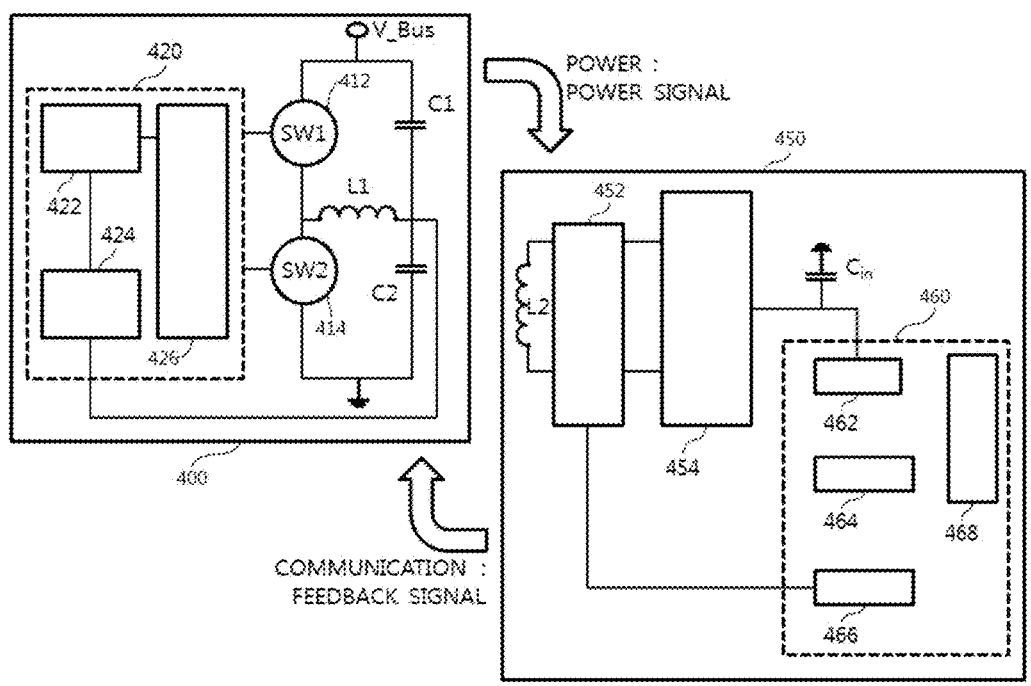
FIG. 4 is a view for explaining an electromagnetic-induction-type wireless charging system according to an embodiment.

FIG. 4 is a view for explaining an electromagnetic-induction-type wireless charging system according to an embodiment.

Referring to FIG. 4, the electromagnetic-induction-type wireless charging system includes a wireless power transmitter 400 and a wireless power receiver 450. The wireless power transmitter 400 and the wireless power receiver 450 are respectively substantially the same as the wireless power transmitter and the wireless power receiver described with reference to FIG. 1.

When an electronic appliance including the wireless power receiver 450 is located on the wireless power transmitter 400, coils of the wireless power transmitter 400 and the wireless power receiver 450 may be coupled to each other by an electromagnetic field.

The wireless power transmitter 400 may modulate a power signal and change a frequency in order to generate an electromagnetic field for power transfer. The wireless power receiver 450 may receive power by demodulating an electromagnetic signal depending on a protocol that is set so as to be suitable for a wireless communication environment, and may transmit a predetermined feedback signal, which is used to control the strength of power to be transferred from the wireless power transmitter 400 based on the strength of received power, to the wireless power transmitter 400 via in-band communication. In one example, the wireless power transmitter 400 may increase or reduce the amount of power to be transferred by controlling an operational frequency in response to a control signal for power control.

The amount of power to be transferred (or an increase/reduction in the amount of power) may be controlled using the feedback signal, which is transmitted from the wireless power receiver 450 to the wireless power transmitter 400. In addition, communication between the wireless power receiver 450 and the wireless power transmitter 400 is not limited only to the aforementioned in-band communication using the feedback signal, but may be performed using out-of-band communication by a separate communication module. For example, a module for near-field wireless communication, such as Bluetooth, Bluetooth Low Energy (BLE), NFC, or ZigBee, may be used.

In electromagnetic induction, a frequency modulation method may be used in a protocol for the exchange of state information and control signals between the wireless power transmitter 400 and the wireless power receiver 450. Apparatus identification information, charging state information, power control signals, and the like may be exchanged via the protocol.

The wireless power transmitter 400 according to an embodiment, as illustrated in FIG. 4, may include a signal generator 420 for generating a power signal, a coil L1 and capacitors C1 and C2, which are located between voltage supply ends V Bus and GND, which may sense the feedback signal transmitted from the wireless power receiver 450, and switches SW1 and SW2, the operation of which is controlled by the signal generator 420. The signal generator 420 may include a demodulator 424 for the demodulation of the feedback signal transmitted through the coil L1, a frequency drive unit 426 for frequency change, and a transmission controller 422 for controlling the demodulator 424 and the frequency drive unit 426. The feedback signal, transmitted through the coil L1, is demodulated by the demodulator 424, and thereafter is input to the transmission controller 422. The transmission controller 422 may control the frequency drive unit 426 based on the demodulated signal, thereby changing the frequency of the power signal to be transmitted to the coil L1.

The wireless power receiver 450 may include a modulator 452 for transmitting the feedback signal through the coil L2, a rectifier 454 for converting an Alternating Current (AC) signal, received through the coil L2, into a Direct Current (DC) signal, and a reception controller 460 for controlling the modulator 452 and the rectifier 454. The reception controller 460 may include a voltage supply unit 462 for supplying a voltage required for the operation of the rectifier 454 and other constituent elements of the wireless power receiver 450, a DC-DC transformer 464 for changing a DC voltage output from the rectifier 454 to a DC voltage that satisfies the charging requirement of a charging object (e.g., a load), the load 468 to which the converted voltage is output, and a feedback communication unit 466 for generating a feedback signal, which is used to provide the wireless power transmitter 400 with, for example, information regarding the state of received power and the state of the charging object.

In FIG. 4, although the coil L1, included in the wireless power transmitter 400, means the three transmission coils 111, 112 and 113 illustrated in FIG. 1, and the switches SW1 and SW2 and the capacitors C1 and C2, connected to the transmission coils 111, 112 and 113, may be provided on each transmission coil 111, 112 or 113, the scope of the disclosure is not limited thereto.

Figure 5:
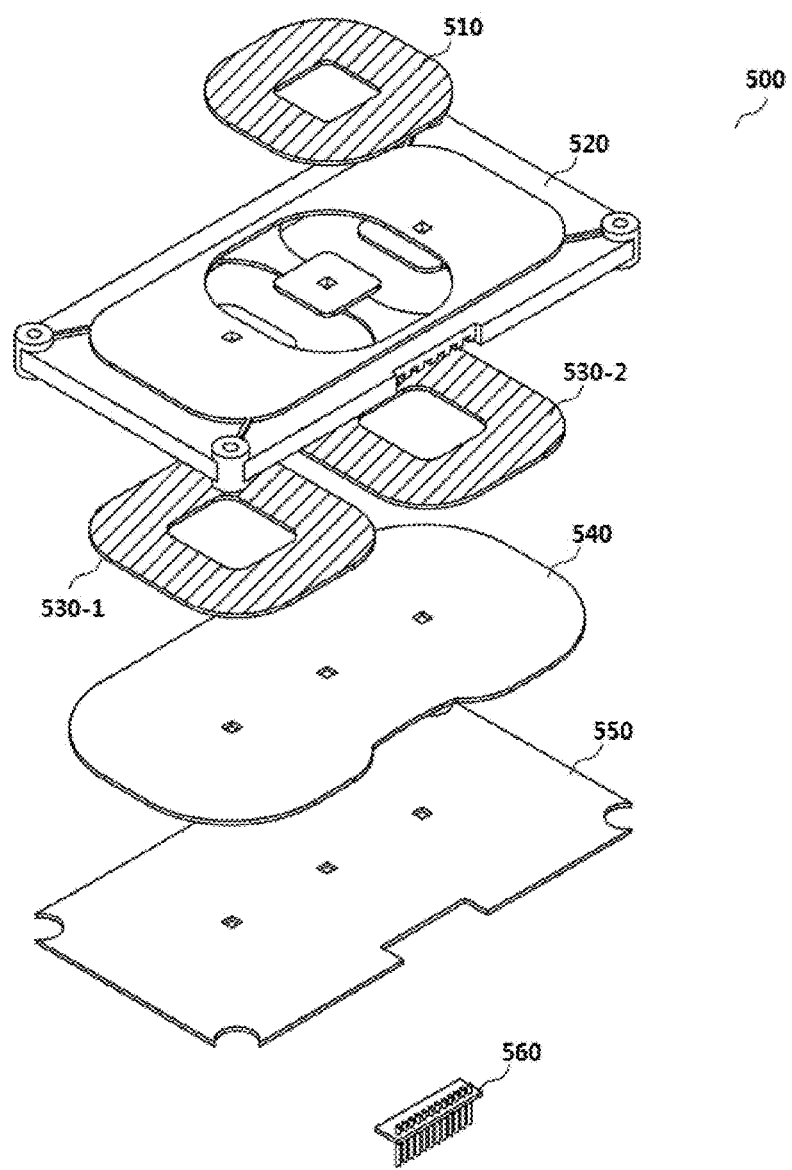
FIG. 5 is a view for explaining the configuration of a transmission coil module according to an embodiment.

FIG. 5 is a view for explaining the configuration of a transmission coil according to an embodiment.

Referring to FIG. 5, a transmission coil module 500 refers to a modular device in which the coil L1 illustrated in FIG. 4 may be mounted so as to be connected to a control circuit board, which includes elements for controlling the operation of the wireless power transmitter 400, such as, for example, the switches SW1 and SW2 and the signal generator 420. The coil mounted in the transmission coil module 500 may include the three transmission coils 111, 112 and 113 illustrated in FIG. 1.

The coils mounted in the transmission coil module 500 may have various standards (e.g. a certified coil based on the WPC standard or a certified coil based on the PMA standard). The shape, size, temperature property, power transfer efficiency, connection property, and the like of coils having various standards may differ between the standards. Accordingly, the transmission coil module 500 may be manufactured so as to be customizable to suit target coils among coils having various standards.

Although a method of manufacturing the transmission coil module 500 such that three coils may be mounted to overlap each other is described in this specification, the scope of the disclosure is not limited thereto. An arbitrary number of coils (e.g. one coil or four coils) may be arranged at arbitrary positions.

The transmission coil module 500 may include a top coil 510, a coil frame 520, first and second bottom coils 530-1 and 530-2, a shield 540, a metal sheet 550, and a connector 560.

The top coil 510 may correspond to any one of the three transmission coils 111, 112 and 113 illustrated in FIG. 1 (e.g. the transmission coil 112). The top coil 510 may be implemented in the form of a spirally wound electric wire, and the cross section of the electric wire may include a conductive material (e.g. copper (Cu)) and an insulating material surrounding the conductive material.

The coil frame 520 may provide a frame on which other elements of the transmission coil module 500, including the top coil 510 and the first and second bottom coils 530-1 and 530-2, may be mounted. Although the coil frame 520 may be formed of reinforced plastic, the scope of the disclosure is not limited thereto. When the coil frame 520 is formed of reinforced plastic, the coils 510, 530-1 and 530-2 may be protected from external shocks and damage, and the overall weight of the transmission coil module 500 may be reduced.

Each of the first and second bottom coils 530-1 and 530-2 may correspond to any one of the three transmission coils 111, 112 and 113 illustrated in FIG. 1 (e.g. the transmission coil 111 or 113). Each of the first and second bottom coils 530-1 and 530-2 may be implemented in the form of a spirally wound electric wire, and the cross section of the electric wire may include a conductive material (e.g. copper (Cu)) and an insulating material surrounding the conductive material.

The first and second bottom coils 530-1 to 530-2 may overlap the top coil 510 so as to prevent the generation of a dead spot in which charging is impossible as the result of areas in which wireless charging is possible being completely separated from each other, and may be spaced apart from each other in the same plane.

The shield 540 may shield a magnetic field generated in the coils 510, 530-1 and 530-2, thereby preventing the magnetic field from being transferred to the external control circuit board. Although the shield 540 may be configured as a ferrite sheet, the scope of the disclosure is not limited thereto.

The metal sheet 550 may function as a radiator, which may maintain the shape of the transmission coil module 500 and may dissipate the heat generated in the coils to the outside. Although the metal sheet 550 may be formed of aluminum (Al), the scope of the disclosure is not limited thereto.

The shield 540 and the metal sheet 550 may be placed inside the coil frame 520.

The connector 560 may allow the coils 510, 530-1 and 530-2 to be connected to the external control circuit board through the coil frame 520.

In this specification, "top" may refer to the side closer to an interface surface on which a wireless power receiver may be placed.

FIGS. 6 to 10 are views respectively for explaining a method of manufacturing the transmission coil module according to an embodiment.

Referring to FIGS. 6 to 10, in a first step S10, the top coil 510 may be inserted into the space in the coil frame 520 that corresponds to the top coil 510.

Prior to describing the insertion process, the detailed configuration of the coil frame 520 will first be described.

The coil frame 520 may include a fixing hole 521, support plates 522-1 to 522-3, central fixing plates 523-1 to 523-3, functional holes 524-1 to 524-3, and a lead wire insertion terminal 525.

The coil frame 520 may provide a first receptacle, into which one transmission coil 510 may be inserted, in the upper region thereof, and a second receptacle and a third receptacle, into which the two transmission coils 530-1 and 530-2 may be respectively inserted, in the lower region thereof. Each of the first receptacle, the second receptacle, and the third receptacle may overlap each other in at least a portion thereof. The scope of the disclosure is not limited thereto. The coil frame 520 may be formed such that two transmission coils are inserted into the upper region thereof and one transmission coil is inserted into the lower region thereof.

The first receptacle includes the area that overlaps each of the second receptacle and the third receptacle, and the overlapping area may be 50% or more of the entire area of the first receptacle.

The fixing hole 521 is formed such that a fixing member (e.g. a bolt or a nut) for fastening with another element of the wireless power transmitter (e.g. the control circuit board) is inserted into the fixing hole 521. That is, the transmission coil module 500 may be fastened to another element using the fixing hole 521 after the manufacturing process illustrated in FIGS. 6 to 10 is completed.

The support plates 522-1 to 522-3 may support the coils 510, 530-1 and 530-2 and may provide the space, into which the coils 500, 530-1 and 530-2 may be inserted, depending on the outer contour and size of the coils 510, 530-1 and 530-2.

That is, the support plate 522-1 supports the top coil 510, and provides the space into which the first and second bottom coils 530-1 and 530-2 may be inserted. The support plate 522-2 supports the first bottom coil 530-1, and provides the space into which the top coil 510 and the first bottom coil 530-1 may be inserted. In addition, the support plate 522-3 supports the second bottom coil 530-2, and provides the space into which the top coil 510 and the second bottom coil 530-2 may be inserted.

The support plates 522-1 to 522-3 may collectively be called a support unit. The support unit may surround the first, second and third receptacles. The central fixing plates 523-1 to 523-3 may provide the space, into which the coils 510, 530-1 and 530-2 may be inserted, depending on the inner shape and size of the coils 510, 530-1 and 530-2. That is, each of the central fixing plates 523-1 to 523-3 may have a shape corresponding to the inner shape of each of the coils 510, 530-1 and 530-2.

A portion of each of a second central fixing plate 523-2 and a third central fixing plate 523-3 may overall the first receptacle. In addition, a portion of a first central fixing plate 523-1 may overlap the second receptacle and the third receptacle.

The support plates 522-1 to 522-3 and the central fixing plates 523-1 to 523-3 may be realized such that the coils 510, 530-1 and 530-2 are fixed thereto so as not to come into contact with one another. In addition, the support plates 522-1 to 522-3, i.e. the support unit, and the central fixing plates 523-1 to 523-3 may be integrally formed with each other.

The upper surface of the central fixing plate 523-1 may be located at the same height as the upper surfaces of the support plates 522-2 and 522-3, and the central fixing plate 523-1 may have the same thickness as the top coil 510. In addition, the upper surface of the support plate 522-1 may be located at the same height as the lower surface of the central fixing plate 523-1, and may provide a space in which the top coil 510 may be seated and fixed.

In the same manner, the lower surfaces of the central fixing plates 523-2 and 523-3 may be at the same height as the lower surface of the support plate 522-1, and the central fixing plates 523-2 and 523-3 may have the same thickness as the first and second bottom coils 530-1 and 530-2. In addition, the lower surfaces of the support plates 522-2 and 522-3 may be at the same height as the upper surfaces of the central fixing plates 523-2 and 523-3, and may provide a space in which the first and second bottom coils 530-1 and 530-2 may be seated and fixed.

The scope of the disclosure is not limited to the above description, and the coil frame 520 may additionally provide an extra space in which lead wires of the coils 510, 530-1 and 530-2 are connected to the lead wire insertion terminal 525.

Although a method using a separate adhesive sheet (e.g. a piece of double-sided tape) or a method of applying a synthetic resin having adhesive and insulating properties (e.g. a bonding method) may be used when the top coil 510 is inserted into the coil frame 520, the scope of the disclosure is not limited thereto.

The functional holes 524-1 to 524-3 may be provided to acquire additional information related to the coils 510, 530-1 and 530-2. For example, a thermistor, which outputs an electrical signal corresponding to the temperature of each of the coils 510, 530-1 and 530-2, may be included in the control circuit board below the functional holes. Each thermistor may sense the temperature of a corresponding one of the coils 510, 530-1 or 530-2 through the functional holes 524-1 to 524-3.

In another embodiment, the functional holes 524-1 to 524-3 may be omitted.

The lead wire insertion terminal 525 may be provided such that all six lead wires of the coils 510, 530-1 and 530-2 may be fitted. Each of the spiral coils 510, 530-1 and 530-2 may be provided on the inner end and the outer end thereof with respective lead wires. The lead wires may correspond to both ends of the coil L1 illustrated in FIG. 4, and may be connected to the control circuit board through the connector 560.

Figure 7:
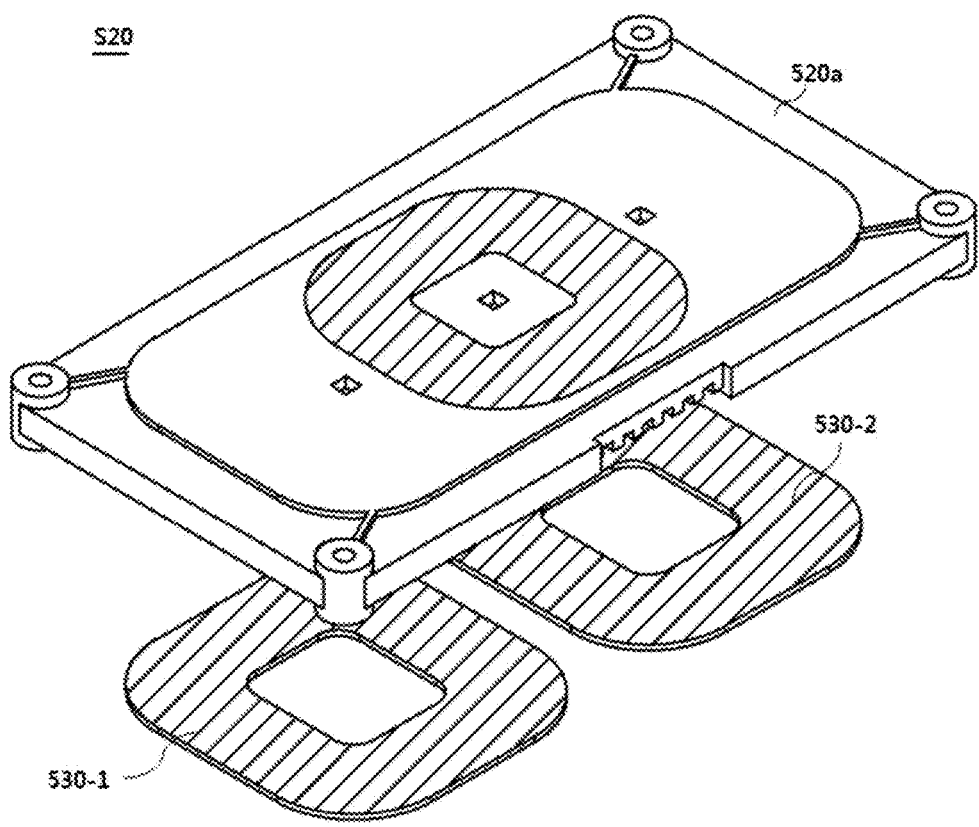

Referring to FIG. 7, in a second step S20, the first and second bottom coils 530-1 and 530-2 may be inserted into the respective spaces corresponding thereto in a coil frame 520*a* on which the top coil 510 has been mounted.

In another embodiment, the second step S20 may be performed before the first step S10.

Although a method using a separate adhesive sheet (e.g. a piece of double-sided tape) or a method of applying a synthetic resin having adhesive and insulating properties (e.g. a bonding method) may be used when the first and second bottom coils 530-1 and 530-2 are inserted into the coil frame 520*a*, the scope of the disclosure is not limited thereto.

Figure 8:
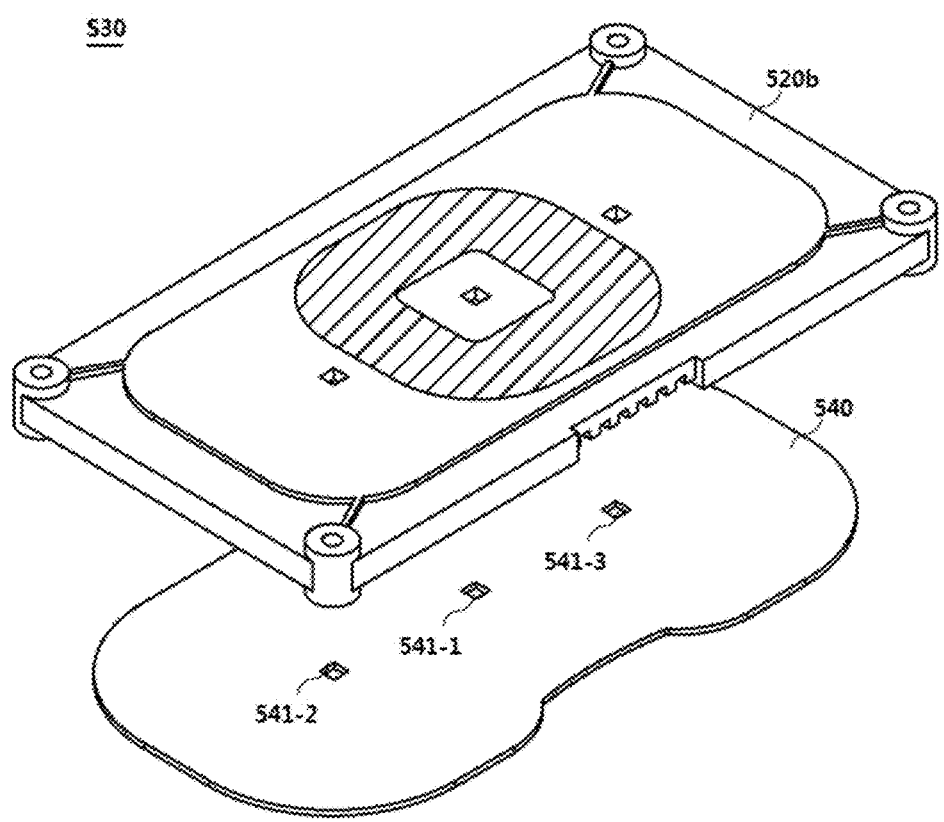

Referring to FIG. 8, in a third step S30, the shield 540 may be attached to the space corresponding thereto in the lower region of a coil frame 520*b* on which the first and second bottom coils 530-1 and 530-2 have also been mounted. The shield 540 may be formed to have an area and shape that correspond to the area and shape of the plane in which the coils 510, 530-1 and 530-2 are arranged. For example, the shield 540 may have a slightly greater area than the area of the plane in which the coils 510, 530-1 and 530-2 are arranged, and may have a shape similar to the shape of the plane. This is because the shield 540 functions to block a magnetic field emitted from the coils 510, 530-1 and 530-2.

Although a method using a separate adhesive sheet (e.g. a piece of double-sided tape may be used when the shield 540 is attached to the coil frame 520*b*, the scope of the disclosure is not limited thereto.

Figure 6:
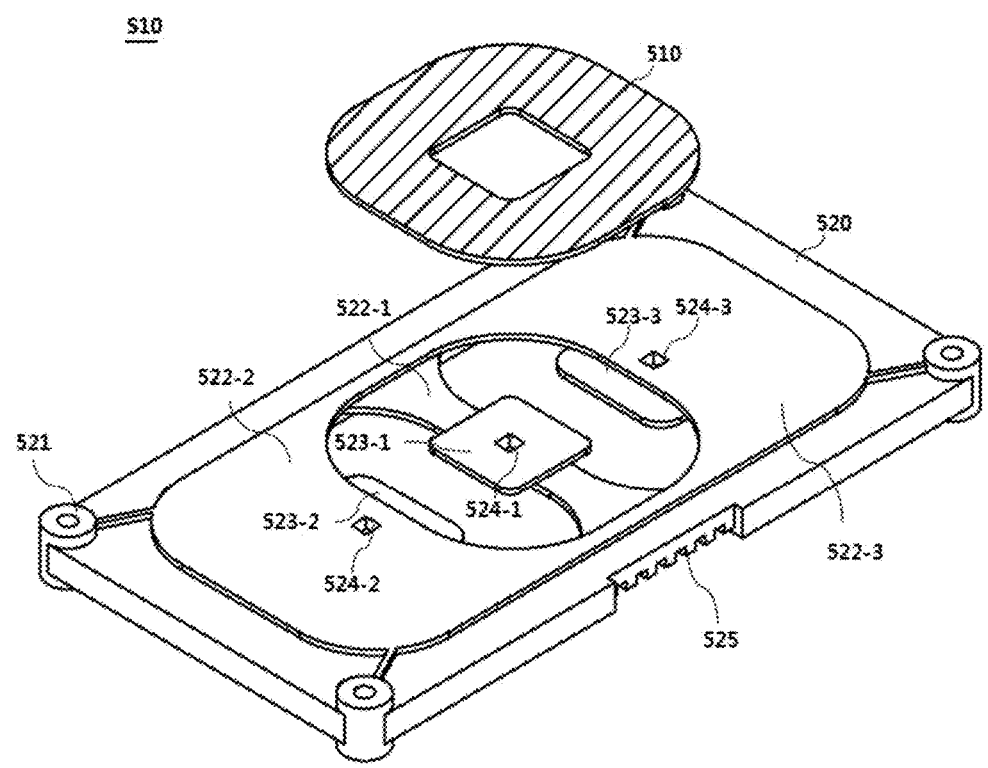
FIGS. 6 to 10 are views respectively for explaining a method of manufacturing the transmission coil module according to an embodiment.

In addition, the shield 540 may be provided with functional holes 541-1 to 541-3, which are located so as to correspond to the functional holes 524-1 to 524-3 described with reference to FIG. 6 and have the same function as the functional holes 524-1 to 524-3.

Figure 9:
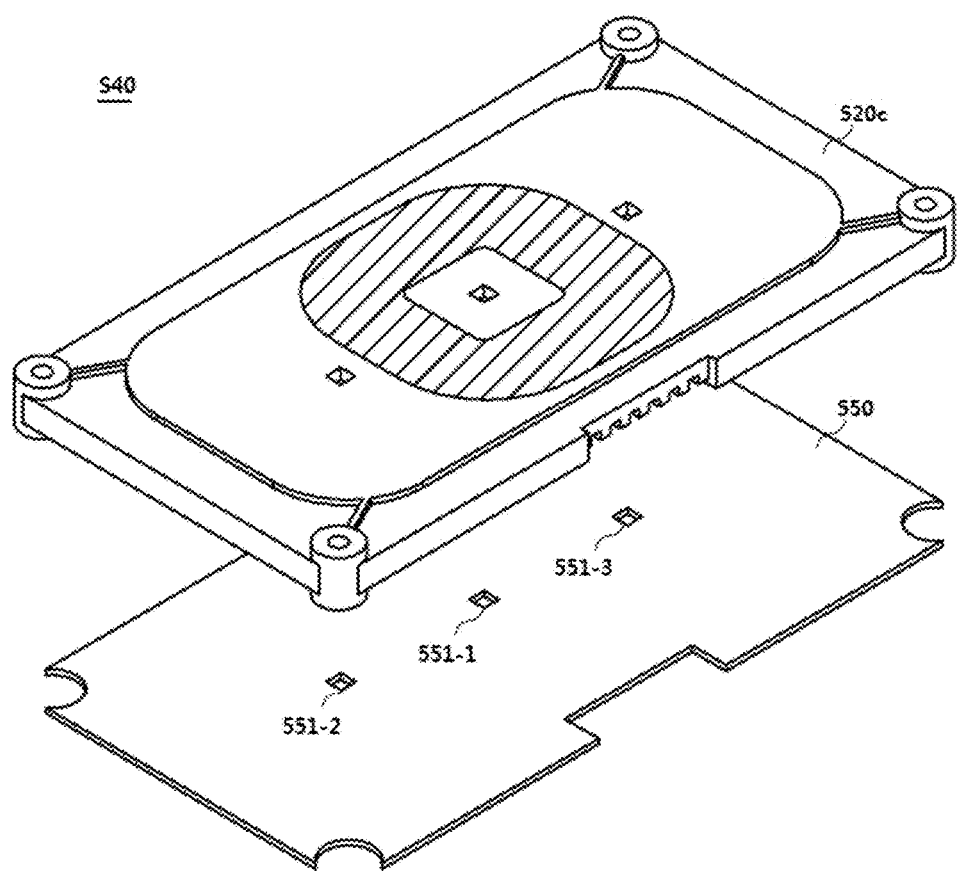

Referring to FIG. 9, in a fourth step S40, the metal sheet 550 may be attached to the space corresponding thereto in the lower region of a coil frame 520*c* on which the shield 540 has also been mounted. The metal sheet 550 may be formed to have the same area and shape as a planar area of the coil frame 520 excluding the fixing hole 521 and the area for attachment of the connector 560.

Although a method using a separate adhesive sheet (e.g. a piece of double-sided tape may be used when the metal sheet 550 is attached to the coil frame 520*c*, the scope of the disclosure is not limited thereto.

In addition, the metal sheet 550 may be provided with functional holes 551-1 to 551-3, which are located so as to correspond to the functional holes 524-1 to 524-3 described with reference to FIG. 6 and have the same function as the functional holes 524-1 to 524-3.

Figure 10:
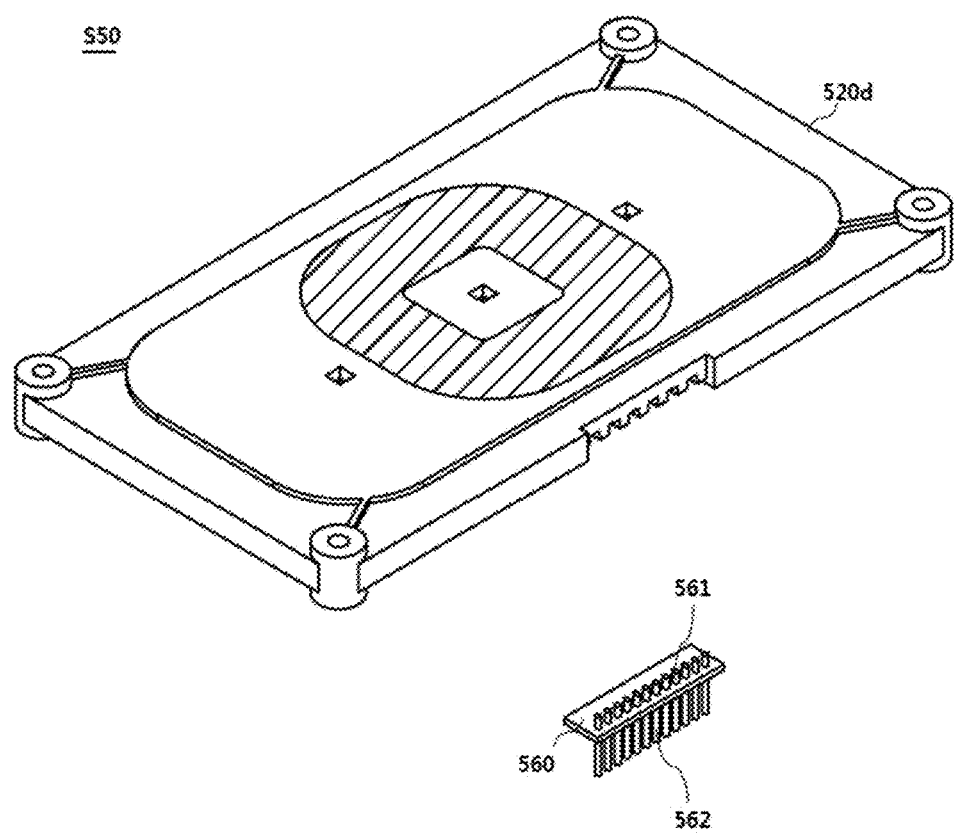

Referring to FIG. 10, in a fifth step S50, the connector 560 may be attached to the space corresponding thereto in the lower region of a coil frame 520*d* on which the metal sheet 550 has also been mounted. The planar area of the connector 560 may be the same as the area of the metal sheet 550 for attachment of the connector 560.

One side surface of the coil frame 520 may be indented (or recessed), and the connector 560 may be located in the indented side surface. In addition, the lead wire insertion terminal 525 is also formed on the indented side surface.

The inner portion of the connector 560 may be attached to the bottom of the coil frame 520d, and the outer portion of the connector 560 may include an upper terminal 561 and a lower terminal 562.

The inner portion of the connector 560 may be attached to the coil frame 520d so as to overlap at least a portion of the lead wire insertion terminal 525. Thereby, lead wires of the coils 510, 530-1 and 530-2 fitted into the lead wire insertion terminal 525 may be fixed.

The upper terminal 561 of the connector 560 may be connected to the lead wires of the respective coils 510, 530-1 and 530-2 mounted on the coil frame 520, and the lower terminal 562 of the connector 560 may be connected to a corresponding terminal of the control circuit board. Specifically, the upper terminal 561 and the lower terminal 562 of the connector 560 may include twelve pins. All six lead wires of the coils 510, 530-1 and 530-2 may be connected respectively to two pins located at corresponding positions, among the twelve pins. Accordingly, among the twelve pins of the lower terminal 562, two respective adjacent pins may be connected to any one of the six lead wires so that the coils 510, 530-1 and 530-2 are connected to the control circuit board.

At this time, although connection between the two pins and the lead wire may be performed via soldering using a laser, the scope of the disclosure is not limited thereto.

In addition, although a method using a separate adhesive sheet (e.g. a piece of double-sided tape) may be used when the connector 560 is attached to the coil frame 520d, the scope of the disclosure is not limited thereto.

The effects of the transmission coil module according to the embodiments will be described below.

With the transmission coil module according to the embodiments, a transmission coil device having optimum functionality may be manufactured using only a simplified process of inserting a corresponding coil into a coil frame having an optimum modular structure and attaching it thereto.

In addition, through the modularization of coils, a transmission coil module, which may be applied without change to various applications (e.g. a wireless power transmitter for vehicles or a wireless power transmitter for charging a mobile phone), may be provided.

In addition, although various standards pertaining to transmission coils exist, as the result of providing a coil frame optimized to a coil having a corresponding standard, when a wireless power transmitter using a coil satisfying a particular standard is manufactured, a coil frame corresponding to the particular standard may be used, which may reduce design costs and the amount of time required for the arrangement of coils, etc.

The effects to be accomplished by the embodiments are not limited to the aforementioned effects, and other unmentioned effects will be clearly understood from the above description by those having ordinary skill in the art.

The method according to the above-described embodiment may be implemented as a program that is to be executed in a computer and may be stored in a computer-readable recording medium, and examples of the computer-readable recording medium may include a ROM, a RAM, a CD-ROM, a magnetic tape, a floppy disc, and an optical data storage device. In addition, the computer readable recording medium is implemented in a carrier wave (e.g., data transmission over the Internet).

The computer-readable recording medium may be distributed in a computer system connected thereto via a network so that a computer-readable code may be stored and executed in a distributed manner. In addition, functional programs, codes, and code segments for realizing the above-described method may be easily deduced by programmers skilled in the art related to the embodiment.

It will be clearly understood by those skilled in the art that the embodiments may be realized in other particular forms within a range that does not deviate from the spirit and essential features of the embodiments.

Accordingly, the above detailed description should not be construed as being limited in all terms, but should be considered to be exemplary. The scope of the embodiments should be determined by the reasonable interpretation of the accompanying claims, and all changes that fall within the range equivalent to the embodiments should be understood as belonging to the scope of the embodiments.

What is claimed is:

1. A transmission coil module for wirelessly transmitting power, the transmitting coil module comprising:
   at least one transmission coil having a hollow portion in a center area thereof;
   a shield disposed below the at least one transmission coil; and
   a metal sheet disposed below the shield,
   wherein the at least one transmission coil includes:
   a top coil disposed at an upper portion and having a hollow portion in a center area thereof;
   a first bottom coil disposed below the top coil and having a hollow portion in a center area thereof; and
   a second bottom coil disposed below the top coil and having a hollow portion in a center area thereof,
   wherein the top coil overlaps a portion of each of the first bottom coil and the second bottom coil, and
   wherein the shield includes a first functional hole in a region corresponding to the hollow portion of the first bottom coil, a second functional hole in a region corresponding to the hollow portion of the top bottom coil, and a third functional hole in a region corresponding to the hollow portion of the second bottom coil.

2. The transmission coil module according to claim 1, wherein the metal sheet includes aluminum (Al).

3. The transmission coil module according to claim 1, wherein the shield is a ferrite sheet.

4. The transmission coil module according to claim 1, wherein the first bottom coil is spaced apart from the second bottom coil in a same plane.

5. The transmission coil module according to claim 1, wherein the at least one transmission coil includes a spirally wound electric wire, and a cross section of the electric wire includes a conductive material and an insulating material surrounding the conductive material.

6. The transmission coil module according to claim 1, wherein the shield is configured to shield a magnetic field generated in the at least one transmission coil and prevent the magnetic field from being transferred to an external control circuit board.

7. The transmission coil module according to claim 1, wherein the metal sheet corresponds to a heat sink.

8. The transmission coil module according to claim 1, wherein the at least one of the first, second and third functional hole in the shield receives a thermistor to sense temperature information of the at least one transmission coil.

9. The transmission coil module according to claim 8, further comprising:
   a printed circuit board below the metal sheet,
   wherein the thermistor is on the printed circuit board and senses the temperature information of the at least one transmission coil.

10. A transmission coil module for wirelessly transmitting power, the transmission coil module comprising:
- a plurality of transmission coils comprising a first transmission coil and a second transmission coil disposed below the first transmission coil;
- a coil frame including a first receptacle formed on a first surface of the coil frame and configured to receive the first transmission coil and a second receptacle formed on a second surface of the coil frame that is opposite to the first surface and configured to receive the second transmission coil;
- a shield disposed below the first transmission coil and the second transmission coil;
- a metal sheet disposed below the shield,
- wherein the coil frame further includes at least one fixing hole on a rim side thereof to receive a fixing member.

11. The transmission coil module according to claim 10, wherein the first receptacle and the second receptacle have a same depth as a thickness of the first transmission coil and the second transmission coil.

12. The transmission coil module according to claim 10, wherein a portion of the first receptacle and a portion of the second receptacle overlap each other.

13. The transmission coil module according to claim 10, wherein the first transmission coil and the second transmission coil overlap each other at an overlapping portion.

14. The transmission coil module according to claim 13, wherein the first transmission coil in the first receptacle and the second transmission coil in the second receptacle contact each other at the overlapping portion.

15. The transmission coil module according to claim 13, wherein some of the overlapping portion is formed to penetrate the coil frame such that a part of the first transmission coil disposed in the first receptacle and a part of the second transmission coil disposed in the second receptacle directly contact with each other.

16. The transmission coil module according to claim 10, wherein the first receptacle includes a first central fixing plate at a central portion of the first receptacle, and the second receptacle includes a second central fixing plate at a central portion of the second receptacle, and
- wherein the first central fixing plate of the first receptacle is disposed at a position corresponding to a hollow portion of the first transmission coil, and the second central fixing plate of the second receptacle is disposed at a position corresponding to a hollow portion of the second transmission coil.

17. The transmission coil module according to claim 16, wherein a part of the first central fixing plate of the first receptacle directly contacts a part of the second transmission coil disposed in the second receptacle and supports the part of the second transmission coil disposed in the second receptacle, and
- wherein a part of second central fixing plate formed in the second receptacle directly contacts a part of the first transmission coil disposed in the first receptacle to support the part of the first transmission coil disposed in the first receptacle.

18. The transmission coil module according to claim 10, wherein the coil frame includes reinforced plastic.

19. The transmission coil module according to claim 10, further comprising:
- a third transmission coil disposed below the first transmission coil,
- wherein the coil frame further includes a third receptacle formed on the second surface of the coil frame and configured to receive the third transmission coil.

* * * * *